(12) United States Patent  (10) Patent No.: US 8,843,782 B2
Guan  (45) Date of Patent: Sep. 23, 2014

(54) METHOD AND APPARATUS FOR RECONSTRUCTING REDUNDANT ARRAY OF INEXPENSIVE DISKS, AND SYSTEM

(71) Applicant: Huawei Technologies Co., Ltd., Guangdong (CN)

(72) Inventor: Weiping Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 13/715,703

(22) Filed: Dec. 14, 2012

(65) Prior Publication Data

US 2013/0132770 A1  May 23, 2013

Related U.S. Application Data

(63) Continuation of application No. PCT/CN2011/080882, filed on Oct. 18, 2011.

(30) Foreign Application Priority Data

Oct. 19, 2010  (CN) .......................... 2010 1 0516539

(51) Int. Cl.
*G06F 11/00* (2006.01)
*G06F 11/20* (2006.01)
*G06F 11/10* (2006.01)

(52) U.S. Cl.
CPC ........ *G06F 11/2053* (2013.01); *G06F 11/1076* (2013.01); *G06F 11/2094* (2013.01)
USPC ...................................................... 714/6.22

(58) Field of Classification Search
CPC  G06F 11/1092; G06F 11/1076; G06F 3/0689
See application file for complete search history.

(56) References Cited

U.S. PATENT DOCUMENTS 7,188,270 B1 *  3/2007  Nanda et al. ................. 714/6.21
7,647,526 B1 *  1/2010  Taylor .......................... 714/6.32

(Continued)

FOREIGN PATENT DOCUMENTS

| CN | 1503224 A | 6/2004 |
| CN | 1519726 A | 8/2004 |
| CN | 101276302 A | 10/2008 |
| CN | 101980137 B | 2/2011 |

OTHER PUBLICATIONS

International Search Report in corresponding International Patent Application No. PCT/CN2011/080882 (Feb. 2, 2012).

(Continued)

*Primary Examiner* — Christopher McCarthy
(74) *Attorney, Agent, or Firm* — Leydig, Voit & Mayer, Ltd.

(57) ABSTRACT

Embodiments of the present invention provide a method and apparatus for reconstructing a RAID, and a system, when a first physical disk is faulty, finding DUs of other physical disks, where the DUs are located on a same LDS as a DU of the first physical disk, in each logic module of a pre-generated layout template, performing exclusive-OR on data read from the DUs of other physical disks, and writing the data into a hot spare DU of a second physical disk; and in the layout template, replacing a DU identifier of the first physical disk with a DU identifier of the second physical disk, where DUs corresponding to DU identifiers in each LDS in the layout template belong to different physical disks. The present invention can reduce time needed for writing the data, shorten time needed for RAID reconstruction and restoration, and improve a reconstruction speed.

11 Claims, 8 Drawing Sheets

(56) References Cited

U.S. PATENT DOCUMENTS

| | | | |
|---|---|---|---|
| 2003/0233611 A1* | 12/2003 | Humlicek et al. | 714/763 |
| 2003/0237019 A1* | 12/2003 | Kleiman et al. | 714/6 |
| 2004/0019821 A1 | 1/2004 | Chu et al. | |
| 2004/0250161 A1* | 12/2004 | Patterson | 714/6 |
| 2006/0277350 A1* | 12/2006 | Lubbers | 711/3 |
| 2013/0024723 A1* | 1/2013 | Govindasamy | 714/6.22 |

OTHER PUBLICATIONS

Written Opinion of the International Searching Authority in corresponding International Patent Application No. PCT/CN2011/080882 (Feb. 2, 2012).

International Search Report in corresponding PCT Patent Application No. PCT/CN2011/080882 (Feb. 2, 2012).

* cited by examiner

| P1 | P2 | P3 | P4 | P5 |
|----|----|----|----|----|
| P6 | P7 | P8 | P9 | P10 |
| P1 | P6 | P2 | P3 | P4 |
| P7 | P8 | P9 | P10 | P5 |
| P1 | P7 | P6 | P2 | P3 |
| P8 | P9 | P10 | P5 | P4 |
| P1 | P8 | P7 | P6 | P2 |
| P9 | P10 | P5 | P4 | P3 |
| P1 | P9 | P8 | P7 | P6 |
| P10 | P5 | P4 | P3 | P2 |
| P1 | P10 | P9 | P8 | P7 |
| P5 | P4 | P3 | P2 | P6 |
| P1 | P5 | P10 | P9 | P8 |
| P4 | P3 | P2 | P6 | P7 |
| P1 | P4 | P5 | P10 | P9 |
| P3 | P2 | P6 | P7 | P8 |
| P1 | P3 | P4 | P5 | P10 |
| P2 | P6 | P7 | P8 | P9 |

FIG. 11

| P1 | P2 | P3 | P4 |
|----|----|----|----|
| P6 | P7 | P8 | P9 |
| P1 | P6 | P2 | P4 |
| P7 | P8 | P9 | P5 |
| P1 | P7 | P2 | P3 |
| P8 | P9 | P5 | P4 |
| P1 | P7 | P6 | P2 |
| P9 | P5 | P4 | P3 |
| P9 | P8 | P7 | P6 |
| P5 | P4 | P3 | P2 |
| P1 | P9 | P8 | P7 |
| P5 | P3 | P2 | P6 |
| P1 | P5 | P9 | P8 |
| P4 | P3 | P6 | P7 |
| P1 | P4 | P5 | P9 |
| P3 | P2 | P6 | P8 |
| P1 | P3 | P4 | P5 |
| P2 | P6 | P7 | P8 |

METHOD AND APPARATUS FOR RECONSTRUCTING REDUNDANT ARRAY OF INEXPENSIVE DISKS, AND SYSTEM

CROSS-REFERENCE TO RELATED APPLICATIONS

This application is a continuation of International Patent Application No. PCT/CN2011/080882, filed on Oct. 18, 2011, which claims priority to Chinese Patent Application No. 201010516539.4, filed on Oct. 19, 2010, both of which are hereby incorporated by reference in their entireties.

FIELD OF THE INVENTION

The present invention relates to the field of storage technologies, and in particular, to a method and apparatus for reconstructing a redundant array of inexpensive disks (RAID), and a system.

BACKGROUND OF THE INVENTION

In a RAID technology, data may be directly stored and read on a physical disk. When the physical disk fails or is in a half-life state, reconstruction may be started to restore data in the failed physical disk or the to-be-failed physical disk to a hot spare disk, and a logic unit number (LUN) of the physical disk is restored to a normal state, which ensures reliability of a whole storage system.

In the existing RAID, if a physical disk fails, data is read from other physical disks of the RAID. Exclusive-OR is performed on the read data and then the data is written into a hot spare disk. This method has a problem: data from multiple physical disks all needs to be written into one hot spare disk, so a written speed of the hot spare disk becomes a bottleneck, thereby resulting in a low RAID reconstruction speed.

SUMMARY OF THE INVENTION

Embodiments of the present invention provide a method and apparatus for constructing a RAID, and a system, which are used to solve a problem in the prior art that a RAID reconstruction speed is low in a case that a physical disk fails, and improve the RAID reconstruction speed.

An embodiment of the present invention provides a method for reconstructing a RAID, including:

when a first physical disk is faulty, finding DUs of other physical disks, where the DUs are located on a same LDS as a DU of the first physical disk, in each logic module of a pre-generated layout template, performing exclusive-OR on data read from the DUs of the other physical disks, and writing the data into a hot spare DU of a second physical disk; and in the layout template, replacing a DU identifier of the first physical disk with a DU identifier of the second physical disk; where, the layout template includes m logic modules, each logic module includes two LDSs, the redundant array of inexpensive disks includes N physical disks; when N is an even number, a value of m is N−1, and each logic disk stripe includes (m+1)/2 disk unit identifiers; or when N is an odd number, a value of m is N, and each logic disk stripe includes (m−1)/2 DU identifiers; DUs corresponding to the DU identifiers in each LDS belong to different physical disks, and DU identifiers included in each LDS in the same logic module are different from each other; the DU identifier of the second physical disk and the DU identifier of the first physical disk are located in a same column of the logic module, and the DU identifiers of the first physical disk and the second physical disk belong to different LDSs.

An embodiment of the present invention further provides an apparatus for reconstructing a RAID, including:

a storage module, configured to store a layout template, where the layout template includes m logic modules, each logic module includes two LDSs, the redundant array of inexpensive disks includes N physical disks; when N is an even number, a value of m is N−1, and each logic disk stripe includes (m+1)/2 disk unit identifiers; or when N is an odd number, a value of m is N, and each logic disk stripe includes (m−1)/2 DU identifiers; the DUs corresponding to the DU identifiers in each LDS belong to different physical disks, and the DU identifiers included in each LDS in the same logic module are different from each other; when N is an even number, a value of m is N−1; when N is an odd number, a value of m is N; and N is a total number of the physical disks in the RAID;

a first processing module, configured to, when a first physical disk is faulty, find DUs of other physical disks, where the DUs are located on a same LDS as a DU of the first physical disk, in each logic module of the layout template stored by the storage module, perform exclusive-OR on data read from the DUs of the other physical disks, and write the data into a DU of a second physical disk; and a second processing module, configured to replace a DU identifier of the first physical disk with a DU identifier of the second physical disk in the layout template, where the DU identifier of the second physical disk and the DU identifier of the first physical disk are located in a same column of the logic module, and the DU identifiers of the first physical disk and the second physical disk belong to different LDSs.

An embodiment of the present invention further provides a RAID system, including the foregoing apparatus for reconstructing the RAID.

Through the method and apparatus for reconstructing the RAID, and the system, which are provided in the embodiments of the present invention, the layout template is pre-generated; when a certain physical disk is faulty, DU identifiers of other physical disks, where the DU identifiers are located on a same LDS as a DU identifier of the faulty physical disk, are found from the layout template, so as to read data from the DUs corresponding to the DU identifiers of the other physical disks, where the DU identifiers are located on the same LDS as the DU identifier of the faulty physical disk; exclusive-OR is performed on the read data, and the data is written into a DU corresponding to a DU identifier of another physical disk, where the DU identifier is located in the same column as the DU identifier of the faulty physical disk in the layout template. The layout template includes m logic modules, each logic module includes two LDSs, each LDS includes (m+1)/2 or (m−1)/2 DUs, and each DU belongs to a different physical disk. The logic module includes multiple DU identifiers of the physical disks, where the DU identifiers are located in the same column as the DU identifier of the faulty physical disk, so the data may be separately written into DUs corresponding to different physical disks, instead of being written into one same hot spare physical disk. Compared with the prior art, time needed for writing the data is reduced, time needed for RAID reconstruction and restoration is shortened, a reconstruction speed is increased, a dual-disk failure probability is reduced, and reliability of the RAID system is improved.

BRIEF DESCRIPTION OF THE DRAWINGS

To illustrate the technical solutions according to the embodiments of the present invention or in the prior art more clearly, accompanying drawings needed for describing the embodiments or the prior art are introduced briefly below. Obviously, the accompanying drawings in the following description are merely some embodiments of the present invention, and persons of ordinary skill in the art may further obtain other drawings according to these accompanying drawings without making creative efforts.

DETAILED DESCRIPTION OF THE EMBODIMENTS

To make the objectives, technical solutions, and advantages of the embodiments of the present invention more clearly, the technical solutions in the embodiments of the present invention are clearly and completely described below with reference to the accompanying drawings in the embodiments of the present invention. Obviously, the described embodiments are merely part of rather than all of the embodiments of the present invention. All other embodiments obtained by persons skilled in the art based on the embodiments of the present invention without making creative efforts shall fall within the protection scope of the present invention.

Figure 1:
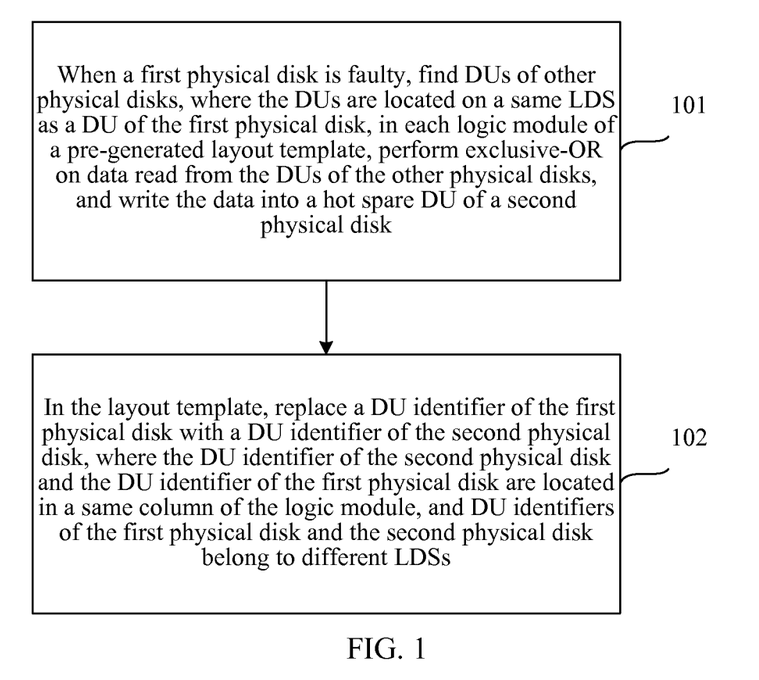
FIG. 1 is a flow chart of a first embodiment of a method for reconstructing a RAID of the present invention.

FIG. 1 shows a flow chart of a first embodiment of a method for reconstructing a RAID of the present invention, including:

Step 101: When a first physical disk is faulty, find disk units (Disk Unit, referred to as DU) of other physical disks, where the DUs are located on a same LDS as a DU of the first physical disk, in each logic module of a pre-generated layout template, perform exclusive-OR on data read from the DUs of the other physical disks, and write the data into a hot spare DU of a second physical disk.

Step 102: In the layout template, replace a DU identifier of the first physical disk with a DU identifier of the second physical disk, where the DU identifier of the second physical disk and the DU identifier of the first physical disk are located in a same column of the logic module, and DU identifiers of the first physical disk and the second physical disk belong to different LDSs.

The layout template includes m logic modules, each logic module includes two logic disk stripes (Logic Disk Stripe, referred to as LDS), the redundant array of inexpensive disks includes N physical disks; when N is an even number, a value of m is N−1, and each logic disk stripe includes (m+1)/2 disk unit identifiers; or when N is an odd number, a value of m is N, and each logic disk stripe includes (m−1)/2 disk unit identifiers; the DUs corresponding to the DU identifiers in each LDS belong to different physical disks, and the DU identifiers included in each LDS in the same logic module are different from each other; N is the number of the physical disks in the RAID, and preferably, N may be greater than or equal to 6.

Figure 2:
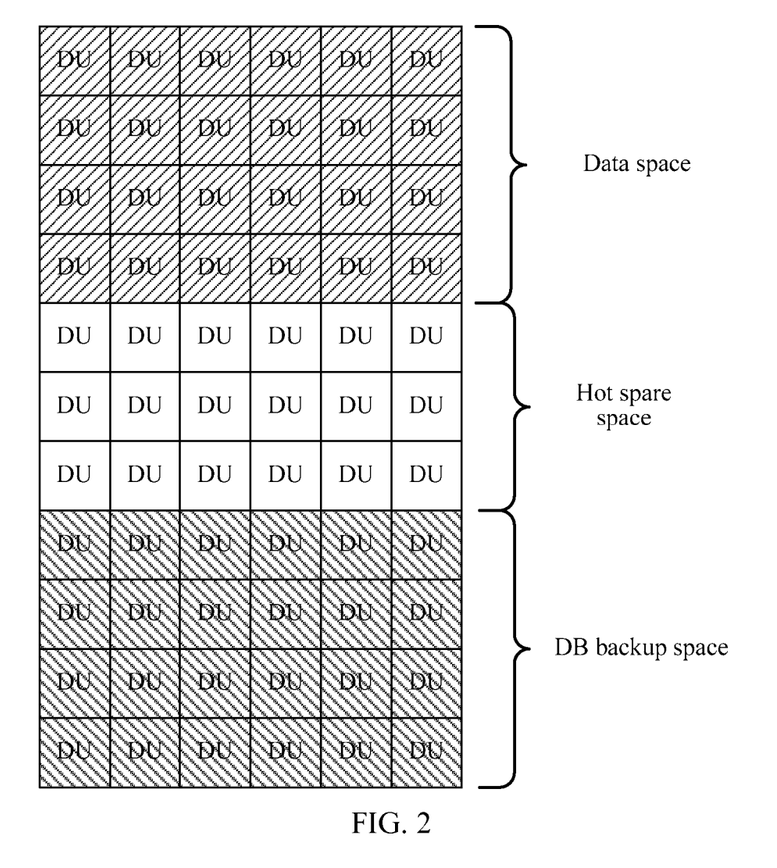
FIG. 2 is a schematic diagram of space partitioning of a physical disk according to an embodiment of the present invention.

In the embodiment of the present invention, the physical disk is partitioned into multiple partitions. FIG. 2 shows a schematic diagram of space partitioning of the physical disk according to an embodiment of the present invention. The physical disk includes a data space, a hot spare space, and a data backup (Data Backup, referred to as DB) space. The data space is used to store normal data. The hot spare space is used to store data restored from other failed disks. The data backup space is used to store a DB compressed package of a storage system. Each storage system needs a file for recording and storing a current system state, configured data and so on, and the system state and the configured data may be collectively referred to as DB. To ensure safety of the file, the DB is compressed by using a compression algorithm when being stored, and is then stored into a raw disk. The compressed DB file is a DB compressed package. In the embodiment of the present invention, the data space, the hot spare space and the data backup space each include multiple DUs, that is, in the embodiment of the present invention, data storage and data reading are performed with a DU as granularity. The DU in the hot spare space is referred to as a hot spare DU.

In the embodiment of the present invention, a layout template may be pre-generated during RAID creation. Generally, when the RAID needs to be established, it is needed to determine which physical disks are included in the RAID, and after the physical disks are determined, an apparatus for managing each physical disk generates the layout template when creating the RAID. A method for generating the layout template may include: arranging DU identifiers of N physical disks according to a preset sequence, and dividing the DU identifiers into two rows; if N is an even number, each row includes N/2 DU identifiers; if N is an odd number, one row includes ((N+1)/2)−1 DU identifiers and one virtual DU identifier, and the other row includes ((N+1)/2) DU identifiers; and fixing a first DU identifier, when N is an even number, sequentially shifting other DU identifiers (N−1) times to generate (N−1) logic modules; when N is an odd number, sequentially shifting other DU identifiers N times to generate N logic modules, removing a column including the virtual DU identifier in each logic module.

The method for generating the layout template is described in detail below.

Figure 3:
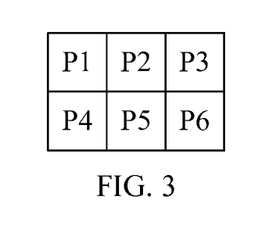
FIG. 3 is a schematic diagram of arrangement of DU identifiers corresponding to six physical disks according to an ascending sequence of numbers in the identifiers.

The RAID may include multiple physical disks. Assume that the RAID includes six physical disks, and P1, P2, P3, P4, P5 and P6 are used as the DU identifiers in each physical disk. The DU identifiers corresponding to the six physical disks are arranged according to a preset sequence, where, for example, the preset sequence may be an ascending sequence of numbers in the identifiers or a sequence of letters in the identifiers. The sequenced DU identifiers are divided into two rows, and each row includes three DU identifiers. FIG. 3 shows a schematic diagram of the DU identifiers corresponding to the six physical disks that are arranged according to the ascending sequence of numbers in the identifiers.

Figure 4:
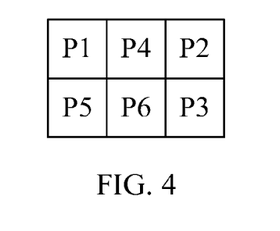
FIG. 4 is a schematic diagram of arrangement of DUs that are shown in FIG. 3 after first circulation is performed.

Then, the position of P1 is fixed, positions of other DU identifiers are successively circled, or namely, sequentially shifted, that is, P4 moves to the position of P2, P2 moves to the position of P3, P3 moves to the position of P6, P6 moves to the position of P5, and P5 moves to the position of P4. In this manner, a schematic diagram of DU arrangement after the first circulation is obtained, as shown in FIG. 4.

Figure 5:
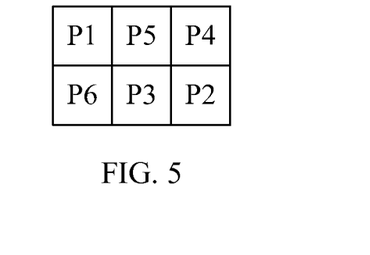
FIG. 5 is a schematic diagram of arrangement of the DUs that are shown in FIG. 3 after second circulation is performed.

Then, the position of P1 is continuously fixed, and the positions of other DU identifiers are successively circled to obtain a schematic diagram of disk arrangement after the second circulation, as shown in FIG. 5.

Figure 6:
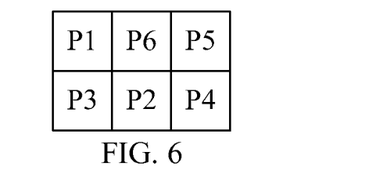
FIG. 6 is a schematic diagram of arrangement of the DUs that are shown in FIG. 3 after third circulation is performed.
Figure 7:
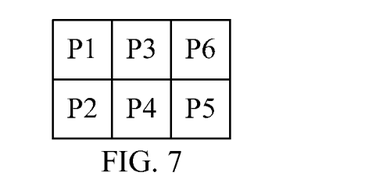
FIG. 7 is a schematic diagram of arrangement of the DUs that are shown in FIG. 3 after fourth circulation is performed.

The position of P1 is continuously fixed, and the positions of other DU identifiers are successively circled. By analogy, schematic diagrams of arrangement of the DU identifiers after the third and the fourth circulation may be obtained, respectively, as shown in FIG. 6 and FIG. 7.

The initially formed DU identifier arrangement and the DU identifier arrangement after each circulation each form a logic module, each logic module includes two LDSs, each LDS includes three DU identifiers, and DUs corresponding to the DU identifiers each belong to different physical disks.

Figure 8:
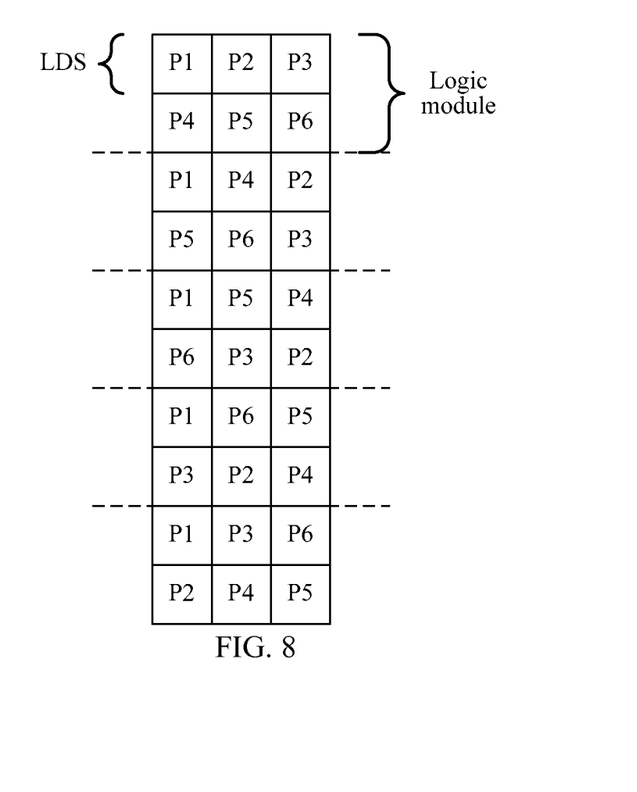
FIG. 8 is a schematic diagram of a layout template formed in a case that six physical disks are included according to an embodiment of the present invention.

Logic modules formed by the DU identifier arrangement after each circulation and the initially formed DU identifier arrangement may form a layout template. FIG. 8 shows a schematic diagram of a layout template formed in the case that six physical disks are included according to the embodiment of the present invention. The layout template includes five logic modules, DU identifiers in each row form a LDS, and DUs corresponding to the DU identifiers in each column form a virtual disk. For a user, the user sees three virtual disks. Actually, the three virtual disks are formed by DUs scattered on the physical disks.

Figure 9:
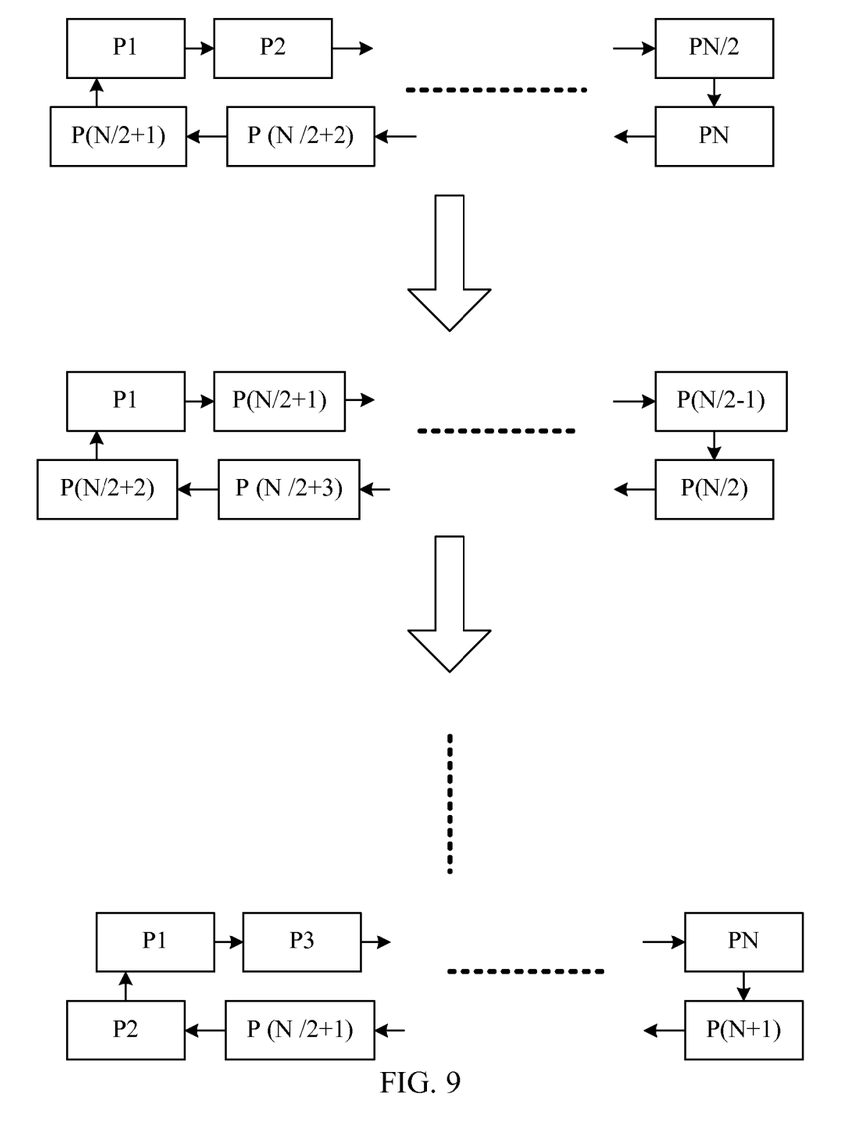
FIG. 9 is a schematic diagram of a layout template formed in a case that N physical disks are included according to an embodiment of the present invention.

The foregoing embodiment is introduced by taking that the RAID includes six physical disks as an example. If the RAID includes N (assume that N is an even number) physical disks, circulation may be performed in a manner shown in FIG. 9 to generate a layout template. FIG. 9 shows a schematic diagram of a layout template generated in a case that N physical disks are included according to an embodiment of the present invention. A specific generating method is the same as that described in the embodiment where six physical disks are included, which are not repeatedly described here.

Figure 10:
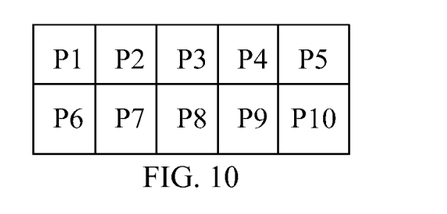
FIG. 10 is a schematic diagram of arrangement of DU identifiers corresponding to ten physical disks according to an ascending sequence of numbers in the identifiers, according to an embodiment of the present invention.

The following takes that a RAID includes an odd number of physical disks as an example for illustration. Assume that the RAID includes nine physical disks, and P1, P2, P3, P4, P5, P6, P7, P8 and P9 are used as DU identifiers in the physical disks, which are taken as an example to perform subsequent circulation steps. A virtual DU identifier P10 may be added. The ten DU identifiers corresponding to the physical disks are arranged according to a preset sequence, where, for example, the preset sequence may be an ascending sequence of numbers in the identifiers. The sequenced DU identifiers are equally divided into two rows, and each row includes five DU identifiers, where the first row includes five DU identifiers of the physical disks, and the second row includes four DU identifiers of the physical disks and one virtual DU identifier. FIG. 10 shows a schematic diagram of the ten DU identifiers corresponding to the physical disks, where the DU identifiers are arranged according to the ascending sequence of numbers in the identifiers, according to an embodiment of the present invention. It should be noted that, in FIG. 10, the virtual DU identifier is arranged in the last, so the virtual DU identifier is arranged in the second row. The virtual DU identifier may also be arranged in the first row if arrangement is performed in other manners.

Figure 11:
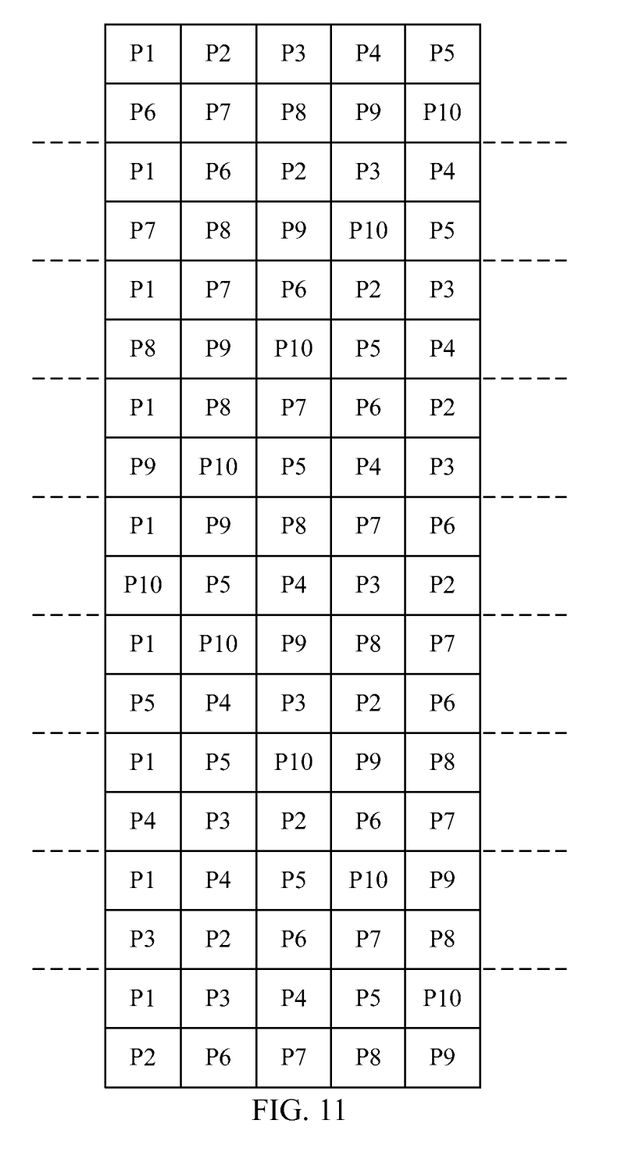
FIG. 11 is a schematic diagram of nine logic modules generated in a case that nine physical disks are included according to an embodiment of the present invention.
Figure 12:
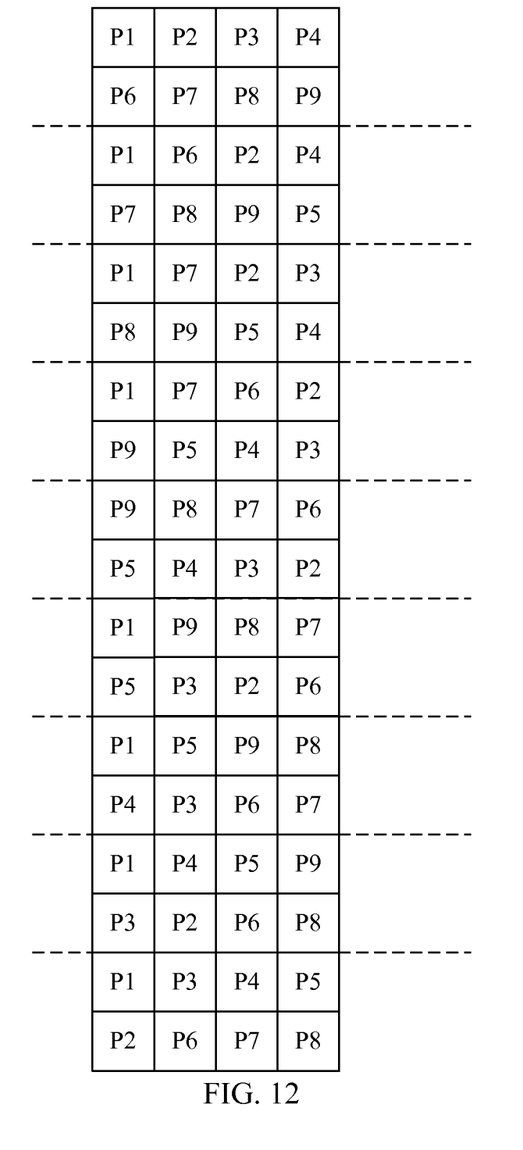
FIG. 12 is a schematic diagram of a layout template generated in the case that nine physical disks are included according to an embodiment of the present invention.

The position of P1 is fixed, and the positions of other DU identifiers are successively circled. After successive circulation for nine times, nine logic modules are generated, and the generated nine logic modules are shown in FIG. 11. FIG. 11 shows a schematic diagram of nine logic modules generated in the case that nine physical disks are included according to the embodiment of the present invention. Then, a column including P10 in each logic module is removed, and a layout template is generated. FIG. 12 shows a schematic diagram of the layout template generated in the case that nine physical disks are included according to the embodiment of the present invention. When a certain physical disk is faulty, other physical disks located on a same LDS as the faulty disk may be found in the layout template, exclusive-OR is performed on data read from DUs corresponding to the DU identifiers of the other physical disks, where the DU identifiers are located on the same LDS as a DU identifier of the faulty disk, and then the data is written into a hot spare DU of another physical disk. A DU identifier of the physical disk where the data is written and the DU identifier of the faulty physical disk may be in the same column in one logic module, and located in different LDSs separately.

For example, a first physical disk is a physical disk where P1 is located, and data in the physical disk where P1 is located may be restored by using physical disks corresponding to other DU identifiers that are located on the same LDS as P1.

Figure 13:
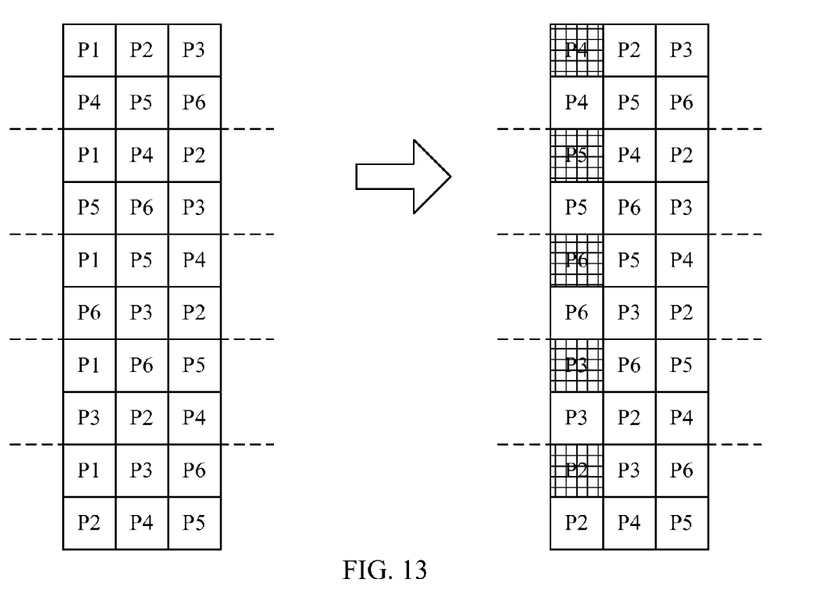
FIG. 13 is a schematic diagram of a layout template after restoration is performed on a faulty physical disk according to an embodiment of the present invention.

The layout template shown in FIG. 8 includes five logic modules. In the first logic template, P1, P2 and P3 are located on the same LDS, data in P2 and P3 are read, exclusive-OR is performed on the read data, then the data is written into P4, and P4 is used to replace P1 in the layout table. P4 and P1 are located in the same column in the first logic module, and P4 and P1 belong to different LDSs. FIG. 13 is a schematic diagram of a layout template after the faulty physical disk is restored according to the embodiment of the present invention.

In the second logic module, P1, P4 and P2 are located on the same LDS, P5 and P1 are located in the same column, data in P4 and P2 may be read, the exclusive-OR is performed on the read data, then the data is written into P5, and P5 is used to replace P1 in the layout template, as shown in FIG. 13.

In the third logic module, P1, P5 and P4 are located on the same LDS, P6 and P1 are located in the same column, data in P5 and P4 may be read, the exclusive-OR is performed on the read data, then the data is written into P6, and P6 is used to replace P1 in the layout template, as shown in FIG. 13.

In the fourth logic module, P1, P6 and P5 are located on the same LDS, P3 and P1 are located in the same column, data in P6 and P5 may be read, the exclusive-OR is performed on the read data, then the data is written into P3, and P3 is used to replace P1 in the layout template, as shown in FIG. 13.

In the fifth logic module, P1, P3 and P6 are located on the same LDS, P2 and P1 are located in the same column, data in P3 and P6 may be read, the exclusive-OR is performed on the read data, then the data is written into P2, and P2 is used to replace P1 in the layout template, as shown in FIG. 13.

Through the foregoing processing, the data in the physical disk where P1 is located is restored by using the data in the DUs of the other physical disks. The restored data is written into P2, P3, P4, P5 and P6, respectively, instead of writing the restored data into one same disk, which increases a data written speed and shorten time of RAID fault restoration, thereby reducing a dual-disk failure probability, and improving reliability of a RAID system.

In the foregoing embodiments, the layout template includes multiple logic modules and each logic module includes a faulty physical disk, so in each logic module, a physical disk corresponding to a DU identifier that is located in the same column as the DU identifier of the faulty physical disk may be seen as a second physical disk. For example, in the first logic module, the physical disk where P4 is located may be seen as the second physical disk. In the second logic module, a physical disk where P5 is located may be seen as the second physical disk.

In the embodiment of the present invention, after reconstruction of the first physical disk is completed (that is, a fault of the first physical disk is restored), a fault may be allowed to occur to another physical disk. If a third physical disk is faulty after fault restoration of the first physical disk, DU identifiers of other physical disks, where the DU identifiers are located on the same LDS as a DU identifier of the third physical disk, are found in each logic module of the layout template, the exclusive-OR is performed on data correspondingly read from the DU identifiers of the other physical disks, and the data is written into a hot spare DU of a fourth physical disk. In the layout template, a DU identifier of the fourth physical disk is used to replace the DU identifier of the third physical disk, where the DU identifier of the fourth physical disk and the DU identifier of the third physical disk are located in the same column of the logic module, and DU identifiers of the third physical disk and the fourth physical disk belong to different LDSs. If in a logic module, two DU identifiers corresponding to the third physical disk are included, in the logic module, the exclusive-OR is performed on data read according to DU identifiers of other physical disks, where the DU identifiers are located on the same LDS as the DU identifiers of the third physical disk, and the data is written into a DU of a fifth physical disk, where a DU identifier of the fifth physical disk is another identifier other than a DU identifier of a physical disk, where the DU identifier is located on the same LDS as the DU identifiers of the third physical disk, in the logic module.

For example, if the first physical disk is the physical disk where P1 is located and the third physical disk is a physical disk where P2 is located, the foregoing method may still be used for the fault restoration in such a case, that is, DU identifiers of other physical disks, where the DU identifiers are located on the same LDS as P1, are found in the layout template, the exclusive-OR is performed on data read from the DUs of the other physical disks, and the data is written into a hot spare DU of a physical disk, where the DU is located in a position corresponding to P1.

The layout template is changed after the physical disk where P1 is located is faulty, and therefore, after the physical disk where P2 is located is also changed, data restoration needs to be performed based on the changed layout template, that is, based on a template shown in FIG. 13.

Figure 14:
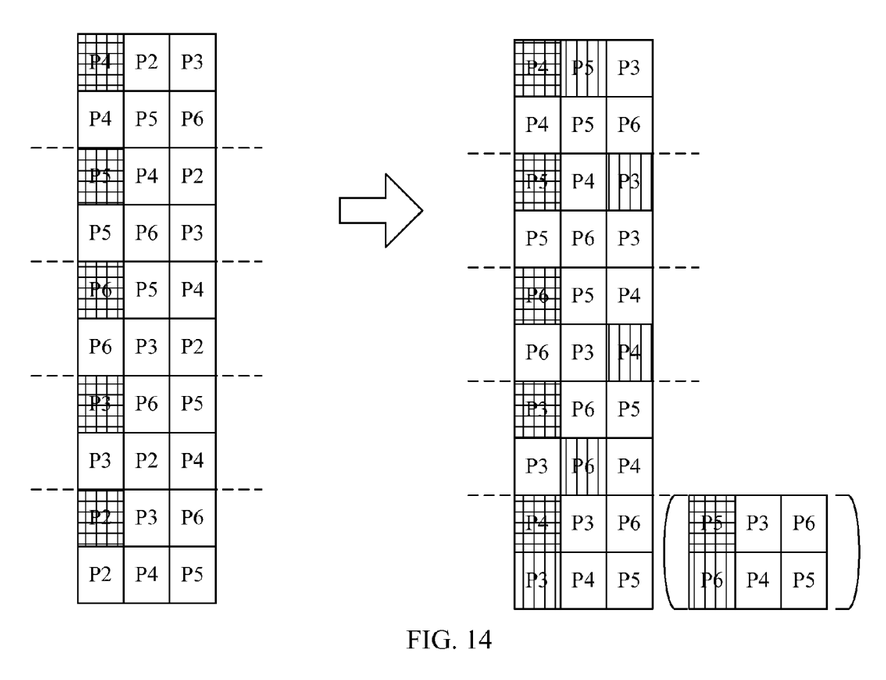
FIG. 14 is a schematic diagram of a layout template during data reconstruction after physical disks where P1 and P2 are located both are faulty according to an embodiment of the present invention.

In FIG. 13, in the first logic module, P2, P4 and P3 are located on the same LDS, P5 and P2 are located in the same column, data in P4 and P3 may be read, the exclusive-OR is performed on the read data, then the data is written into P5, and P5 is used to replace P2 in the layout template. As shown in FIG. 14, FIG. 14 is a schematic diagram of a layout template during data reconstruction after the physical disks where P1 and P2 are located are faulty according to the embodiment of the present invention.

In the second logic module, P5, P4 and P2 are located on the same LDS, P3 and P2 are located in the same column, data in P5 and P4 may be read, the exclusive-OR is performed on the read data, then the data is written into P3, and P3 is used to replace P2 in the layout template, as shown in FIG. 14.

In the third logic module, P6, P3 and P2 are located on the same LDS, P4 and P2 are located in the same column, data in P6 and P3 may be read, the exclusive-OR is performed on the read data, then the data is written into P4, and P4 is used to replace P2 in the layout template, as shown in FIG. 14.

In the fourth logic module, P2, P3 and P4 are located on the same LDS, P6 and P2 are located in the same column, data in P4 and P3 may be read, the exclusive-OR is performed on the read data, then the data is written into P6, and P6 is used to replace P2 in the layout template, as shown in FIG. 14.

In the fifth logic module, P2, P3 and P6 are located on the same LDS, and P2 which is used to replace P1 previously in the layout template and P2 originally existing in the layout template are located in the same column. At this time, data of any other two DUs in the layout template may be read, the exclusive-OR is performed on the read data, and then the data is written into another DU. For example, as shown in FIG. 14, data in P3 and P6 may be read, the exclusive-OR is performed on the read data, and then the data is written into P4; data in P4 and P5 are read, the exclusive-OR is performed on the read data, and then the data is written into P3; P3 and P4 are used to replace P2 in the layout template. Alternatively, data in P3 and P6 is read, the exclusive-OR is performed on the read data, and then the data is written into P5; data in P4 and P5 is read, the exclusive-OR is performed on the read data, and then the data is written into P6; P5 and P6 are used to replace P2 in the layout template.

Through the foregoing steps, data in the physical disk where P2 is located is restored by using other physical disks, and the restored data is stored into the DUs of other physical disks each time.

In the foregoing embodiments, the layout template includes multiple logic modules and each logic module includes a faulty physical disk; therefore, in each logic module, a physical disk corresponding to a DU identifier that is located in the same column as the DU identifier of the third physical disk may be seen as the fourth physical disk. For example, in the first logic module, the physical disk where P5 is located may be seen as the fourth physical disk. In the second logic module, the physical disk where P3 is located may be considered as the fourth physical disk. In the fifth logic module, the physical disks where P5, P4, P6 and P3 are located may be seen as the fifth physical disk. The first physical disk, the second physical disk, the third physical disk, the fourth physical disk and the fifth physical disk are component physical disks in the same RAID.

Through the method provided in the embodiment of the present invention, the granularity of data storage is a DU, and a physical disk includes a dedicated hot spare DU for storing data restored by using other physical disks, in this way, faults in multiple physical disks is allowed. A restoration method after the faults occur is the same as the foregoing method.

Through the method, the apparatus and the system provided in the embodiments of the present invention, the layout template is pre-generated; when a certain physical disk is faulty, DU identifiers of other physical disks, where the DU identifiers are located on the same LDS as a DU identifier of the faulty physical disk, are found from the layout template, and data from the DUs corresponding to the DU identifiers of the other physical disks, where the DU identifiers are located on a same LDS as the DU identifier of the faulty physical disk, is read; the exclusive-OR is performed on the read data, and then the data is written into a DU corresponding to a DU identifier of another physical disk, where the DU identifier is located in a same column as the DU identifier of the faulty physical disk in the layout template. The layout template includes m logic modules, each logic module includes two LDSs, each LDS includes (m+1)/2 or (m−1)/2 DUs, and each DU belongs to a different physical disk. The logic module includes multiple DU identifiers of the physical disks, where the DU identifiers are located in the same column as the DU identifier of the faulty physical disk, the data may be separately written into DUs corresponding to different physical disks, instead of being written into a same hot spare physical disk. Compared with the prior art, time needed for writing the data is reduced, time needed for RAID reconstruction and restoration is shortened, a reconstruction speed is increased, the dual-disk failure probability is reduced, and the reliability of the RAID system is improved.

In the method for reconstructing the RAID provided in the embodiment of the present invention, after the reconstruction is completed, a normal disk for replacing the faulty first physical disk is re-inserted. At this time, copyback is needed, that is, data in a hot spare DU of the second physical disk is copied back to the re-inserted physical disk that is used for replacing the first physical disk, and the layout template is restored to a state when the replacement is not performed, for example, as shown in FIG. 8.

Figure 15:
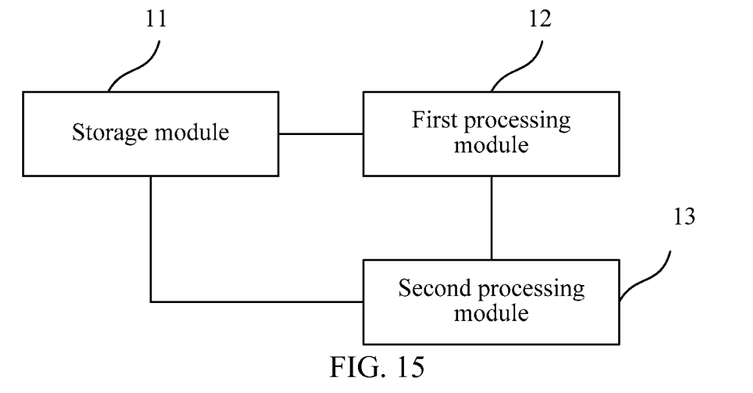
FIG. 15 is a schematic structural diagram of a first embodiment of an apparatus for reconstructing a RAID of the present invention.

FIG. 15 shows a schematic structural diagram of a first embodiment of an apparatus for reconstructing a RAID of the present invention, where the apparatus includes a storage module 11, a first processing module 12 and a second processing module 13. The storage module 11 is configured to store a layout template, where the layout template includes m logic modules, each logic module includes two LDSs, each LDS includes of (m+1)/2 or (m−1)/2 DU identifiers; DUs corresponding to the DU identifiers in each LDS belong to different physical disks, and DU identifiers included in each LDS in the same logic module are different from each other; when N is an even number, a value of m is N−1; when N is an odd number, a value of m is N; and N is a total number of the physical disks in the RAID. The first processing module 12 is connected to the storage module 11, and is configured to: when a first physical disk is faulty, find DUs of other physical disks, where the DUs are located on the same LDS as a DU of the first physical disk, in each logic module of the layout template stored by the storage module 11, perform exclusive-OR on data read from the DUs of the other physical disks, and then write the data into a hot spare DU of a second physical disk. The second processing module 13 is configured to replace a DU identifier of the first physical disk with a DU identifier of the second physical disk in the layout template, where the DU identifier of the second physical disk and the DU identifier of the first physical disk are located in a same column of the logic module, and DU identifiers of the first physical disk and the second physical disk belong to different LDSs.

The first processing module 12 is further configured to, when a third physical disk is faulty after fault restoration of the first physical disk, find DUs of other physical disks, where the DUs are located on the same LDS as a DU of the third physical disk, in each logic module of the layout template, perform the exclusive-OR on data read from the DUs of the other physical disks, and then write the data into a hot spare DU of a fourth physical disk. The second processing module 13 may be further configured to: in the layout template, replace a DU identifier of the third physical disk with a DU identifier of the fourth physical disk, where the DU identifier of the fourth physical disk and the DU identifier of the third physical disk are located in the same column in the logic module; in a case that two DU identifiers corresponding to the third physical disk are included in one logic module, perform the exclusive-OR on data read from DUs of other physical disks, where the DUs are located on the same LDS as DUs of the third physical disk, and then write the data into a DU of a fifth physical disk, where a DU identifier of the fifth physical disk is another identifier in the logic module other than a DU identifier of a physical disk, where the DU identifier is located on the same LDS as the DU identifier of the third physical disk.

Figure 16:
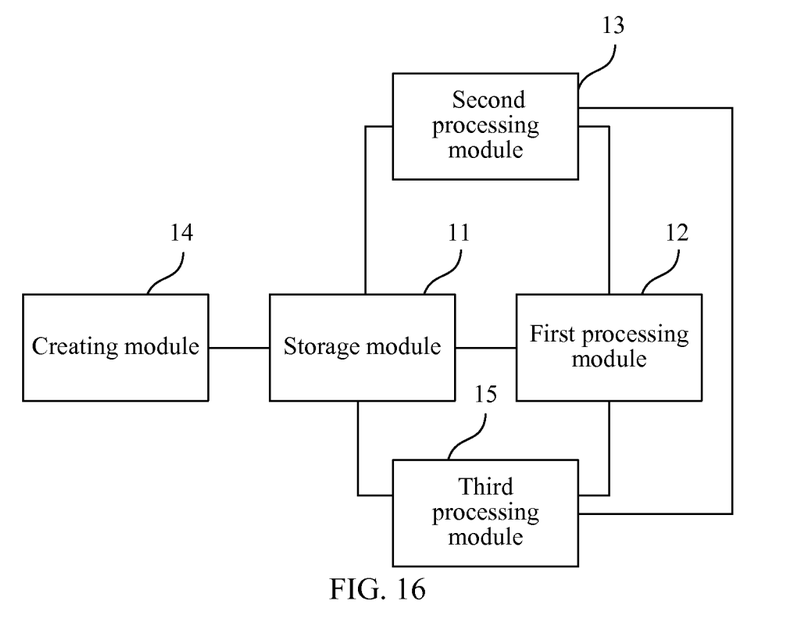
FIG. 16 is a schematic structural diagram of a second embodiment of an apparatus for reconstructing a RAID of the present invention.

FIG. 16 shows a schematic structural diagram of a second embodiment of an apparatus for reconstructing a RAID of the present invention. In this embodiment, the apparatus for reconstructing the RAID further includes a creating module 14, configured to generate a layout template during RAID creation.

Specifically, the creating module 14 is configured to: arrange DU identifiers of N physical disks according to a preset sequence, and divide the DU identifiers into two rows, where, when N is an even number, each row includes N/2 DU identifier; and when N is an odd number, one row includes ((N+1)/2)−1 DU identifiers and one virtual DU identifier, and the other row includes (N+1)/2 DU identifiers; fix a first DU identifier, and when N is an even number, sequentially shift the other DU identifiers (N−1) times to generate (N−1) logic modules; when N is an odd number, sequentially shift the other DU identifiers N times to generate N logic modules; and remove a column including the virtual DU identifier in each logic module.

This embodiment may further include a third processing module 15. The third processing module is connected to the storage module 11, the first processing module 12 and the second processing module 13, and is configured to, after processing of the first processing module 12 and the second processing module 13 is completed, copy data in a hot spare DU in a second physical disk back to a re-inserted physical disk that is used for replacing a first physical disk, and restore the layout template to a state when replacement is not performed.

Working principles of the modules in the apparatus for reconstructing the RAID are the same as the part described in the foregoing method embodiment, which are not repeatedly described here.

An embodiment of the present invention further provides a RAID system, where the system includes the apparatus for reconstructing the RAID in each foregoing embodiment. The apparatus for reconstructing the RAID may be connected to each physical disk to process each physical disk in the RAID.

Through the apparatus and the system provided in the embodiments of the present invention, the layout template is pre-generated; when a certain physical disk is faulty, DU identifiers of other physical disks, where the DU identifiers are located on a same LDS as a DU identifier of the faulty physical disk, are found from the layout template, so as to read data from the DUs corresponding to the DU identifiers of the other physical disks, where the DU identifiers are located on the same LDS as the DU identifier of the faulty physical disk; the exclusive-OR is performed on the read data, and then the data is written into a DU corresponding to a DU identifier of another physical disk, where the DU identifier is located in a same column as the DU identifier of the faulty physical disk in the layout template. The layout template includes m logic modules, each logic module includes two LDSs, each LDS includes (m+1)/2 or (m−1)/2 DUs, and each DU belongs to a different physical disk. The logic module includes multiple DU identifiers of the physical disks, where the DU identifiers are located in the same column as the DU identifier of the faulty physical disk, so the data may be separately written into DUs corresponding to different physical disks, instead of being written into a same hot spare physical disk. Compared with the prior art, the time needed for writing the data is reduced, the time needed for RAID reconstruction and restoration is shortened, the reconstruction speed is increased, the dual-disk failure probability is reduced, and the reliability of the RAID system is improved.

Persons of ordinary skill in the art may understand that, all or part of the steps of the foregoing method embodiments may be implemented by a program instructing relevant hardware. The program may be stored in a computer readable storage medium. When the program is executed, the steps of the foregoing method embodiments are executed. The storage medium may be various media that may store program codes, such as a ROM, a RAM, a magnetic disk, or a compact disk, and so on.

Finally, it should be noted that the foregoing embodiments are merely used for describing the technical solutions of the present invention, but not intended to limit it. Persons of ordinary skill in the art should understand that although the present invention are described in detail with reference to the foregoing embodiments, modifications may still be made to the technical solutions described in each of the foregoing embodiments, or equivalent replacements may be made to part of the technical features, but such modifications or replacements do not make the nature of corresponding technical solutions depart from the spirit and scope of the technical solutions in each of the embodiments of the present invention.

What is claimed is:

1. A method for reconstructing a redundant array of inexpensive disks, comprising:
   when a first physical disk is faulty, finding disk units of other physical disks, where the disk units are located on a same logic disk stripe as a disk unit of the first physical disk, in each logic module of a pre-generated layout template, performing exclusive-OR on data read from the disk units of the other physical disks, and writing the data into a hot spare disk unit of a second physical disk; and
   in the layout template, replacing a first disk unit identifier of the first physical disk with a second disk unit identifier of the second physical disk;
   wherein the layout template comprises m logic modules, each logic module comprises two logic disk stripes, the redundant array of the inexpensive disks comprises N physical disks; when N is an even number, a value of m is N−1, and each logic disk stripe comprises (m+1)/2 disk unit identifiers; or when N is an odd number, a value of m is N, and each logic disk stripe comprises (m−1)/2 disk unit identifiers, the disk units corresponding to the disk unit identifiers in each logic disk stripe belong to different physical disks, and the disk unit identifiers comprised in each logic disk stripe in the same logic module are different from each other; the second disk unit identifier and the first disk unit identifier are located in a same column of the logic module, and disk unit identifiers of the first physical disk and the second physical disk belong to different logic disk stripes.

2. The method according to claim 1, wherein if a third physical disk is faulty after fault restoration of the first physical disk, the disk units of the other physical disks, where the disk units locate on the same logic disk stripe as a disk unit of the third physical disk, are found in each logic module of the layout template, the exclusive-OR is performed on data read from the disk units of the other physical disks, and the data is written into a disk unit of a fourth physical disk; in the layout template, a fourth disk unit identifier of the fourth physical disk is used to replace a third disk unit identifier of the third physical disk; the fourth disk unit identifier and the third disk unit identifier are located in the same column of the logic module, and disk unit identifiers of the third physical disk and the fourth physical disk belong to different logic disk stripes; and
   if in a logic module, two disk unit identifiers corresponding to the third physical disk are comprised, in the logic module, after the exclusive-OR is performed on data read from disk units of disk unit identifiers of other physical disks, where the disk unit identifiers are located on the same logic disk stripe as the disk unit identifiers of the third physical disk, the data is written into a disk unit of a fifth physical disk, wherein a fifth disk unit identifier of the fifth physical disk is another identifier in the logic module other than the disk unit identifier of the physical disk, where the disk unit identifier is located on the same logic disk stripe as the third disk unit identifier.

3. The method according to claim 2, further comprising: generating the layout template during creation of the redundant array of the inexpensive disks.

4. The method according to claim 3, wherein the generating the layout template comprises:
   arranging disk unit identifiers of N physical disks according to a preset sequence, and dividing the disk unit identifiers into two rows, wherein if N is an even number, each row comprises N/2 disk unit identifier; if N is an odd number, one row comprises ((N+1)/2)−1 disk unit identifiers and one virtual disk unit identifier, and the other row comprises ((N+1)/2) disk unit identifiers; and
   fixing a sixth disk unit identifier, when N is an even number, sequentially shifting the other disk unit identifiers (N−1) times to generate (N−1) logic modules; when N is an odd number, sequentially shifting the other disk unit identifiers N times to generate N logic modules, and removing a column comprising the virtual disk unit identifier in each logic module.

5. The method according to claim 1, further comprising: after completion of reconstruction of the redundant array of the inexpensive disks, copying data in a hot spare disk unit of the second physical disk back to a re-inserted physical disk that is used for replacing the first physical disk, and restoring the layout template to a state when replacement is not performed.

6. An apparatus for reconstructing a redundant array of inexpensive disks, comprising:
   a storage module, configured to store a layout template, wherein the layout template comprises m logic modules, each logic module comprises two logic disk stripes, the redundant array of the inexpensive disks comprises N physical disks; when N is an even number, a value of m is (N−1), and each logic disk stripe comprises (m+1)/2;

or when N is an odd number a value of m is N and each logic disk stripe comprises (m+1/2 disk unit identifiers, disk units corresponding to the disk unit identifiers in each logic disk stripe belong to different physical disks, and disk unit identifiers comprised in each logic disk stripe in the same logic module are different from each other;

a first processing module, configured to, when a first physical disk is faulty, find disk units of other physical disks, where the disk units are located on the same logic disk stripe as a disk unit of the first physical disk, in each logic module of the layout template stored in the storage module, perform exclusive-OR on data read from the disk units of the other physical disks, and write the data into a disk unit of a second physical disk; and a second processing module, configured to replace a first disk unit identifier of the first physical disk with a second disk unit identifier of the second physical disk in the layout template, wherein the second disk unit identifier and the first disk unit identifier are located in the a column of the logic module, and disk unit identifiers of the first physical disk and the second physical disk belong to different logic disk stripes.

7. The apparatus according to claim 6, wherein the first processing module is further configured to, when a third physical disk is faulty after fault restoration of the first physical disk, find disk units of other physical disks, where the disk units are located on the same logic disk stripe as a disk unit of the third physical disk, in each logic module of the layout template, perform the exclusive-OR on data read from the disk units of the other physical disks, and write the data into a hot spare disk unit of a fourth physical disk; and the second processing module is further configured to, in the layout template, replace a third disk unit identifier of the third physical disk with a fourth disk unit identifier of the fourth physical disk, wherein the fourth disk unit identifier and the third disk unit identifier are located in the same column in the logic module; in a case that two disk unit identifiers corresponding to the third physical disk are comprised in one logic module, perform the exclusive-OR on data read from disk units of other physical disks, where the disk units are located on the same logic disk stripe as disk units of the third physical disk, and write the data into a disk unit of a fifth physical disk, wherein a fifth disk unit identifier of the fifth physical disk is another identifier in the logic module other than a disk unit identifier of a physical disk, where the disk unit is located on the same logic disk stripe as the disk unit identifiers of the third physical disk.

8. The apparatus according to claim 7, further comprising: a creating module, configured to generate the layout template during creation of the redundant array of the inexpensive disks.

9. The apparatus according to claim 8, wherein the creating module is configured to arrange disk unit identifiers of N physical disks according to a preset sequence, and divide the disk unit identifiers into two rows, wherein, when N is an even number, each row comprises N/2 disk unit identifier; and when N is an odd number, one row comprises ((N+1)/2)−1 disk unit identifiers and one virtual disk unit identifier, and the other row comprises (N+1)/2 disk unit identifiers; fix a first disk unit identifier, and when N is an even number, sequentially shift the other disk unit identifiers (N−1) times to generate (N−1) logic modules; when N is an odd number, sequentially shift the other disk unit identifiers N times to generate N logic modules; and remove a column comprising the virtual disk unit identifier in each logic module.

10. The apparatus according to claim 6, further comprising a third processing module, configured to, after processing of the first processing module and the second processing module is completed, copy data in a hot spare disk unit of the second physical disk back to a re-inserted physical disk that is used for replacing the first physical disk, and restore the layout template to a state when replacement is not performed.

11. A redundant array of inexpensive disks system, comprising the apparatus for reconstructing the redundant array of inexpensive disks according to claim 6.

* * * * *

UNITED STATES PATENT AND TRADEMARK OFFICE
CERTIFICATE OF CORRECTION

PATENT NO. : 8,843,782 B2  Page 1 of 1
APPLICATION NO. : 13/715703
DATED : September 23, 2014
INVENTOR(S) : Guan It is certified that error appears in the above-identified patent and that said Letters Patent is hereby corrected as shown below:

On the Title Page, Item (71) Applicant, "Guangdong (CN)" should read -- Shenzhen (CN) --.

In the Claims

Column 13, line 2, "(m+1/2" should read -- (m-1)/2 --.

Signed and Sealed this
Third Day of February, 2015

Michelle K. Lee
*Deputy Director of the United States Patent and Trademark Office*